US011132741B2

(12) United States Patent
Filppula

(10) Patent No.: US 11,132,741 B2
(45) Date of Patent: Sep. 28, 2021

(54) SYSTEM AND METHOD FOR FACILITATING SALES TRANSACTION

(71) Applicant: Miko Filppula, Lantana, FL (US)

(72) Inventor: Miko Filppula, Lantana, FL (US)

(73) Assignee: Social Shopping Network LLC, Plantation, FL (US)

( * ) Notice: Subject to any disclaimer, the term of this patent is extended or adjusted under 35 U.S.C. 154(b) by 550 days.

(21) Appl. No.: 13/714,316

(22) Filed: Dec. 13, 2012

(65) Prior Publication Data

US 2013/0262257 A1 Oct. 3, 2013

Related U.S. Application Data

(60) Provisional application No. 61/615,950, filed on Mar. 27, 2012, provisional application No. 61/619,871, filed on Apr. 3, 2012.

(51) Int. Cl.
*G06Q 40/00* (2012.01)
*G06Q 30/08* (2012.01)

(52) U.S. Cl.
CPC .................................... *G06Q 30/08* (2013.01)

(58) Field of Classification Search
CPC ................. G06Q 30/0601-0645; G06Q 30/08
USPC .......................................... 705/26.1-27.2, 37
See application file for complete search history.

(56) References Cited

U.S. PATENT DOCUMENTS 6,366,891 B1 4/2002 Feinberg
6,702,673 B2 * 3/2004 Webb .................. G07F 17/3223 273/148 B
8,838,976 B2 * 9/2014 Etchegoyen ............ G06F 21/31 713/176
2002/0007338 A1 * 1/2002 Do .................................. 705/37
2003/0004855 A1 * 1/2003 Dutta et al. ...................... 705/37
2003/0078871 A1 * 4/2003 Webb ..................... G06Q 30/08 705/37
2005/0154639 A1 7/2005 Zetmeir
2005/0216300 A1 9/2005 Appelman et al.
2007/0201659 A1 * 8/2007 Altberg ............ H04M 3/42008 379/201.01
2007/0239594 A1 * 10/2007 Conwell ................ G06Q 40/04 705/37

(Continued)

OTHER PUBLICATIONS

Doughroller Article, published Apr. 23, 2012 entitled "The Million Doller Business of Swoopo—Penny Auctions Review" Michael Pruser; https://doughroller.net.*

(Continued)

*Primary Examiner* — Sunit Pandya
(74) *Attorney, Agent, or Firm* — Jayne Saydah

(57) ABSTRACT

A system and method for facilitating an on-line fee based auction of an item is provided. The item has a predetermined pre-funding requirement amount that needs to be satisfied for the item to become a live auction item. Users may fund the item, which will count toward satisfying the pre-funding requirement amount of the item. For funding the item, the users are provided with a number of bid credits corresponding to their funding amount, which can be used by the users in bidding on any of the live auction items. Each of the live auction items are associated with an independent countdown timer indicative of the time remaining until the end of the auction, and each bid placed by the users adjusts the countdown timer.

18 Claims, 8 Drawing Sheets

(56) References Cited

U.S. PATENT DOCUMENTS

| | | | | |
|---|---|---|---|---|
| 2009/0182664 | A1* | 7/2009 | Trombley | G06Q 10/10 705/42 |
| 2010/0082446 | A1 | 4/2010 | Hjelm et al. | |
| 2010/0332306 | A1 | 12/2010 | Darveau-Garneau | |
| 2011/0066518 | A1* | 3/2011 | Mack | G06Q 30/08 705/26.3 |
| 2011/0125605 | A1 | 5/2011 | Chatter et al. | |
| 2011/0153449 | A1 | 6/2011 | Hite | |
| 2012/0246020 | A1* | 9/2012 | Kersten et al. | 705/26.3 |
| 2012/0296760 | A1* | 11/2012 | Smith | G06Q 30/08 705/26.3 |
| 2013/0006798 | A1* | 1/2013 | Yushuva et al. | 705/26.3 |
| 2013/0304599 | A1 | 11/2013 | Vincent | |

OTHER PUBLICATIONS

U.S. Appl. No. 12/817,047, filed Nov. 27, 2011, nicolas Darveau-Garneau.

* cited by examiner

SYSTEM AND METHOD FOR FACILITATING SALES TRANSACTION

RELATED APPLICATION DATA

This application claims the priority of prior U.S. provisional application Ser. No. 61/615,950 filed on Mar. 27, 2012, which is hereby incorporated by reference herein in its entirety and U.S. provisional application Ser. No. 61/619,871, filed on Apr. 3, 2012, which is hereby incorporated by reference herein in its entirety.

TECHNICAL FIELD

Embodiments of the present invention relate generally to online commerce, and more particularly to a method and a system for facilitating fee-based auction over a network.

BACKGROUND

The Internet is no longer just an information delivery medium. The Internet is now considered as one of the biggest market place for sales of goods and services. Online market place such as Amazon.com offers retail shop like experience to its users to purchase various items including books, electronics and even foods. Online auction is another venue in the online shopping industry. For example, eBay.com allows its users to sell and purchase all kinds of goods and services in one of its auction formats.

Recently, online fee-based auction system (e.g., penny-auction) has been introduced, offering different type of shopping experience to the users. The fee-based auction system works different from the conventional online auction system. Unlike the conventional auction system where a user is free to bid or raise the bidding amount on the item, the user in the fee-based auction system is required to purchase a bid credit in order to place a bid on the item. In other words, the user needs to pay a fee to bid on the item. Each time the user bid on the item, the price of the item is raised by a certain amount (e.g., 1 cent) and often resets a timer by certain time (e.g., 10 seconds) for open bidding. When the timer runs out, the last bidder wins the item at the final price, which is often substantially lower than the item's retail price.

The main problem in a typical fee-based auction is the lack of transparency during the auction process. Because the timer renews every time a bid is placed on the item to extend the duration of auction and the fact that the bid credit seller (i.e., the auction operator) gains profit by selling additional bid credits to the users, the auction site operator is often questioned for artificially extending the auction by outbidding the bid placed by a legitimate user and/or shill bidding to drive up the final price of the item. On the other hand, a group of users can manipulate the bidding process by allowing one user to bid on certain item while another user bids on other item, thereby causing significant financial loss to the auction operator.

SUMMARY

The present disclosure provides a transparent SNS verified bidding fee-based auction system for facilitating sales of goods and services via a network and a method for implementing such transparent online fee-based auction system.

According to one aspect of the present disclosure, a method for facilitating an online-fee-based auction is disclosed. The method includes receiving at least one fund submission from one or more users towards at least one item. Each of the users are provided with a number of bid credits, which corresponds to the amount of the fund submitted by the respective user. When one or more auction initiation criteria are met, the auction for the item is initiated. The auction initiation criteria may include a threshold pre-funding requirement amount of the item, a threshold number of fund submissions received from the users on the item, a threshold time period for satisfying the threshold amount of the pre-funding requirement amount, and a predetermined hold period after reaching a threshold fund amount for the item. The auction of the item will end at the expiration of the adjustable countdown timer, which is configured to adjust its remaining time in response to receiving a bid on the item. In some embodiments, the time remaining in the adjustable countdown timer reverts to a maximum time period set for the adjustable countdown timer when a bid is placed on the item. In some other embodiments, the time remaining in the adjustable countdown timer is increased by a predetermined time value in response to receiving a bid on the item.

In another aspect of the present disclosure, a system for facilitating an online-fee-based auction is disclosed. The system includes at least one processor, a pre-funding management module and an auction module, which are executable by the processor. The pre-funding management module manages to receive of one or more fund submissions from one or more users on at least one item, and provide each of the users with a number of bid credits corresponding to each of the fund submission received from the respective user. The auction module is operable to conduct an auction of the item. In particular, the auction module is configured to initiate the auction of the item when one or more auction initiation criteria are satisfied for the item. The auction initiation criteria may include a threshold pre-funding requirement amount of the item, a threshold number of fund submissions received from the users on the item, a threshold time period for satisfying the threshold amount of the pre-funding requirement amount, and a predetermined hold period after reaching a threshold fund amount for the item. Upon initiation of the auction, the auction module provides an adjustable countdown timer associated to the item which indicates the time remaining in the auction of the item. The auction module is further configured to adjust the time remaining in the adjustable countdown timer, when a bid is placed on the item before the adjustable countdown timer expires. When the countdown timer expires, the auction module ends the auction with the user who placed the last bid on the item being the winner of the auction.

The disclosure extends to a machine-readable medium embodying a set of instructions to facilitate an on-line fee-based auction.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left most digit in the corresponding reference number.

DETAILED DESCRIPTION

Figure 1:
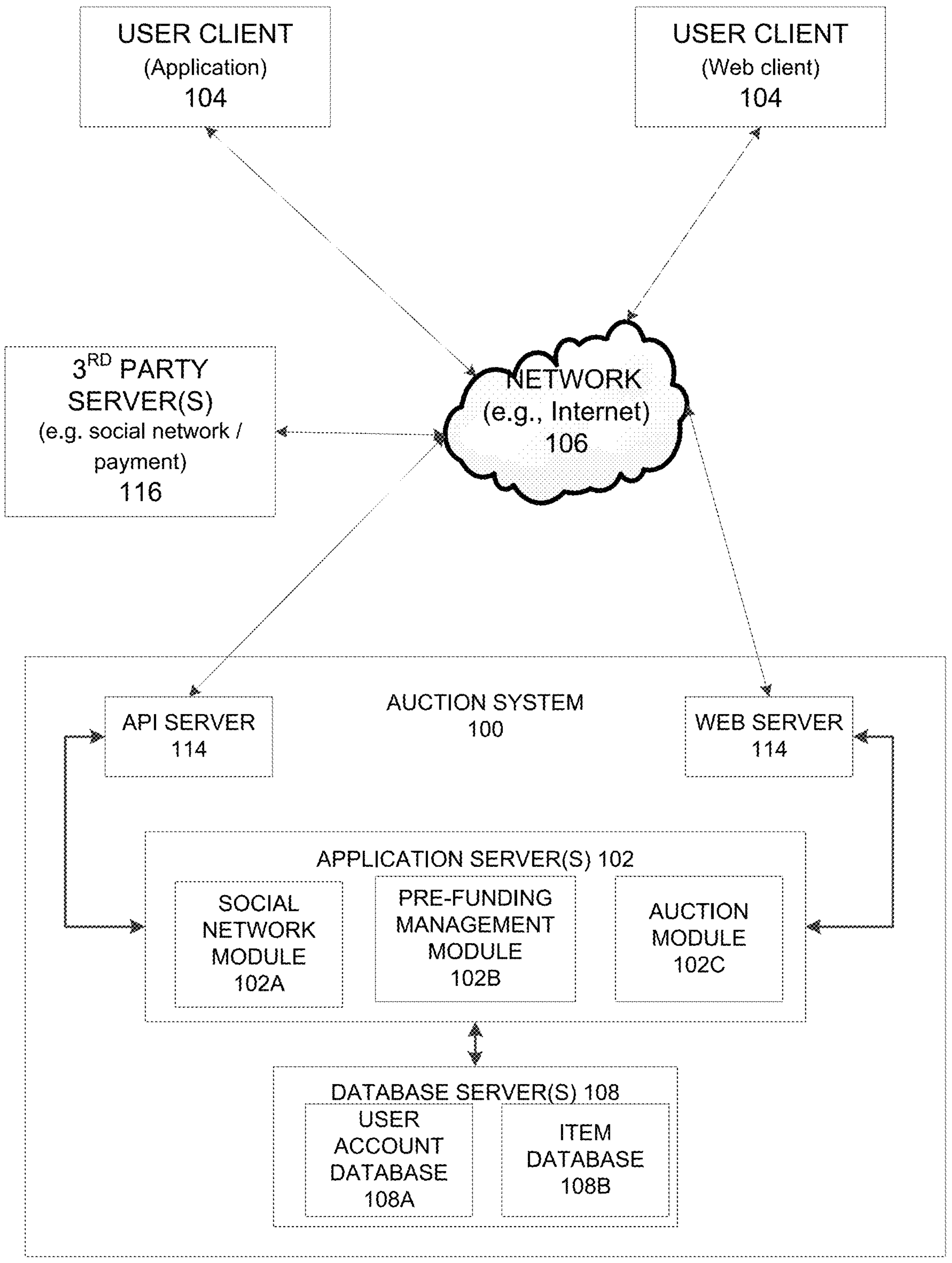
FIG. 1 is a block diagram of an exemplary system for building an on-demand business aviation trip, according to an embodiment of the present invention.

While the present invention is described herein with reference to illustrative embodiment for particular applications, it should be understood that the invention is not limited thereto. For example only Facebook or Google verified users will be allowed to bid on one embodiment, this way users can be sure they are always bidding against other legitimate users and never shilled or out bid by the auction site operator. Those skilled in the art with access to the teachings provided herein will recognize additional modifications, applications, and embodiments within the scope thereof and additional fields in which the invention would be of significant utility.

Overview

A system and method for implementing an online fee-based auction system is disclosed herein. The online fee-based auction system (referred hereinafter as the "auction system") of the present disclosure employs the pre-funding requirement configuration, in which each of the listed item has a predetermined pre-funding requirement amount that must be satisfied to become a live auction item eligible for bidding. The item's pre-funding requirement amount can be satisfied by receiving a sufficient amount of funds from the users. For funding any of the listed items, the user receives a number of bid credits to be used for placing bids on any of the live auction items. An adjustable countdown timer is associated with the live auction item, and the users are allowed to bid on the live auction item before the timer runs out. However, the remaining time of the countdown timer may reset to the default value or otherwise be adjusted when with each bid placed on the item.

The auction system may further include a number of additional auction management features to optimize the sales transaction via the auction system while preventing, or at least substantially eliminating, the possible artificial manipulation of the auction by the buyers, sellers and the auction system administrator. Such auction management features may include, but are not limited to, one or more of countdown timer management features, user verification features, user classification or level management features, as well as auction control items, which are described in further detail below. For instance, the countdown timer may be configured to incrementally run at faster paced each time when the timer resets to the default value preset for the countdown timer. Also, the auction system may be integrated with third-party social network sites, applications and platforms, and/or the auction system may include an internal social networking platform that can be used in checking a user's eligibility for bidding on another user's item. Moreover, the auction system may employ a user account classification/user account level system, in which the users belonging to certain classes or achieving certain levels are provided with certain privileges or a special set of auction controlling features to tweak some elements of the auction in their favor. Various other features and mechanisms may be included in various embodiments of the auction system to provide more transparent and balanced fee-based auction system for all participants (i.e., sellers, buyers and the auction system administrator).

FIG. 1 is a network diagram illustrating an exemplary environment for implementing the auction system 100 according to an embodiment of the present disclosure. The auction system 100 may function as a publishing tool, where users may communicate, view, search, and exchange data with the auction system to complete sales of goods and services with another user (e.g., third-party private sellers). However, it should be noted that some of the listed items on the auction system 100 may be listed by the auction system administrator, and thus the term "seller" in the present disclosure may include both a "third-party private seller" as well as the auction system administrator.

As shown in FIG. 1, the auction system 100 may include an application server 102, which may be configured to provide server-side functionality to one or more user clients 104, via a network 106. The application server(s) 102 may implement various application modules to carry out various features and functionalities of the auction system disclosed herein. For example, a social network module 102A may be implemented on the application server 102 to provide various social networking functionalities such as user accounts registration, profile management and user communication features. The application server 102 may also implement a pre-funding management module 102B, which may be configured to handle a variety of financial related operations ranging from the receipt of funds, issuance of bid credits, calculation of the final price of the item to the winning bidder, to distribution of proceeds between the third-party private seller and the auction system administrator. Moreover, the application server 102 may include an auction module 102C, which may implement various auction operation related features, such as the auction initiation criteria check functionality, countdown timer management functionality as well as various other auction operation related features disclosed in the present disclosure. Of course, various additional application modules may be implemented in the application server 102 to carry out any of the features and functions disclosed in the present disclosure.

As illustrated in FIG. 1, the application server 102 may be configured communicate with one or more database server(s) 108, and access one or more databases 110 coupled to the database server(s) 108. For example, the database server 108 may include a user account database 108A and an item database 108B. The user account database 108A may be configured to store various user related information obtained or generated by the social network module 102A and other modules of the auction system such that the user account data can be accessed the auction system 100 during the operation. The item database 108B may be configured to store various information relating to the listed items as well as the live auction items, such as the item's pre-funding requirement amount, the amount of fund received at certain moments and any rules/limitations applicable to specific items, such as the auction initiation criteria, bid eligibility set for the item and various criteria for reducing the countdown timer. Any data received from the user clients 104 as well as any data generated and/or obtained via the application modules disclosed herein, may be stored to and retrieved from the appropriate databases coupled to the database server 108.

For simplicity, the aforementioned application modules 102A-C are discussed as being an integral part of the application server 102; however, it can be appreciated these application modules may be implemented with one or more discrete servers remote from auction system 100. Likewise, the auction system 100 may utilize additional database servers, which may be remote from the auction system 100.

It is contemplated that the user clients 104 provide a suitable user interfaces to enable the users to access the auction system 100. The user interface may be implemented as a proprietary software provided on the user clients 104 (e.g. dedicated iOS® application, general PC installable standalone software) or as web-based interface accessible via any conventional web browser (e.g., Internet Explorer by Microsoft, Inc., Chrome by Google, Inc., Safari by Apple, Inc.) It is sufficient that the user clients allow the user to access the auction system 100 and interact with various application modules to facilitate necessary data exchanges. To facilitate accessing the auction system 100 via multiple types of user interfaces, the auction system 100 may also include an application program interface ("API") server 112 and a web server 114.

As will be described in further detail below, in some embodiments, the auction system 100 may be configured to access and/or be accessed by one or more third-party applications running on third-party servers 116. For instance, the social network module 102A may be configured to communicate with one or more external third-party social networking platforms to obtain information relevant to the users of the auction system 100. Also, the auction system 100 may be configured to communicate with a third-party payment processing service (e.g., Paypal®) to handle receipt of funds from the users or payment for the item. In such cases, the communications between the application module of the auction system 100 and the third-party applications may be achieved via one or more programmatic interface provided by the API server 112. The API server 112 and the web server 114 may be implemented in a separate server as depicted in FIG. 1; however, it should be appreciated that they can be implemented as application modules included in the application server 102 and provide necessary APIs and web interfaces for the appropriate user clients 104.

Exemplary Operation

Figure 2:
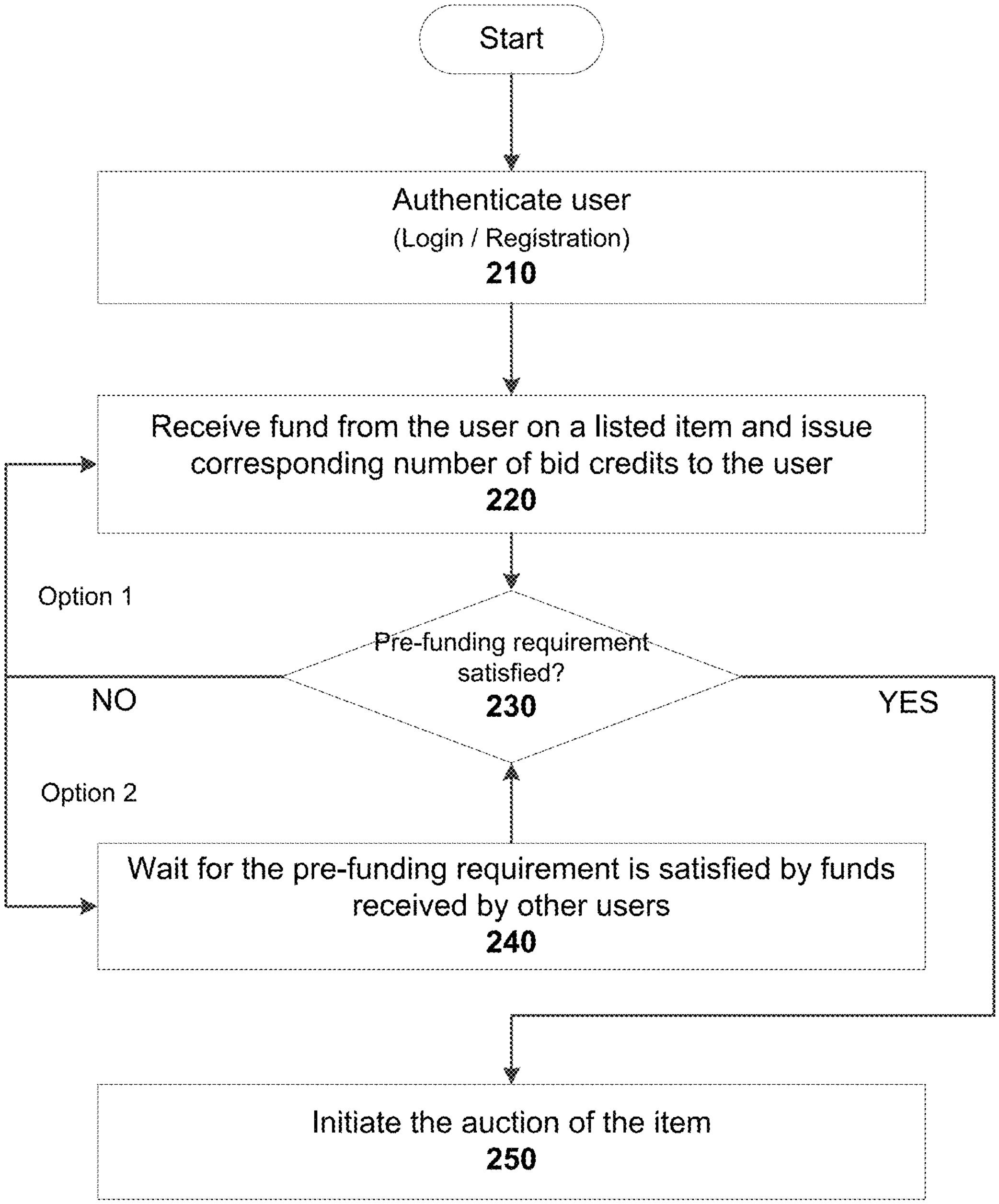
FIG. 2 is a flowchart illustrating exemplary operations of an auction system according to an embodiment of the present disclosure.

FIG. 2 is a simplified flowchart illustrating exemplary operations of an embodiment of the auction system 100 for initiating an auction of a listed item. As described above, one of the main concerns in the conventional fee-based auction system is the fraudulent manipulation of auction processes by the buyers, sellers and the auction system administrator. Implementing a user account structure that enables the users to verify other users' identities may reduce the fraudulent activities in the auction system 100. Although the listed items and the live auction items may be presented on the user client 104, the user may not be able to bid on the items or use other features of the auction system 100 prior to being authenticated by the auction system 100.

User Authentication

Accordingly, in 210, the auction system 100 may authenticate the user before allowing the user to utilize one or more features of the auction system 100. For simplicity, the authentication mechanism is described as a login identification/password combination in the present disclosure. However, other types of identification verification means, such as biometric sensor verification or face recognition features provided on the user client 104, may be used by the auction system to authenticate the user. Any type of user authentication methods currently known or developed later in the future may be used.

Figure 3:
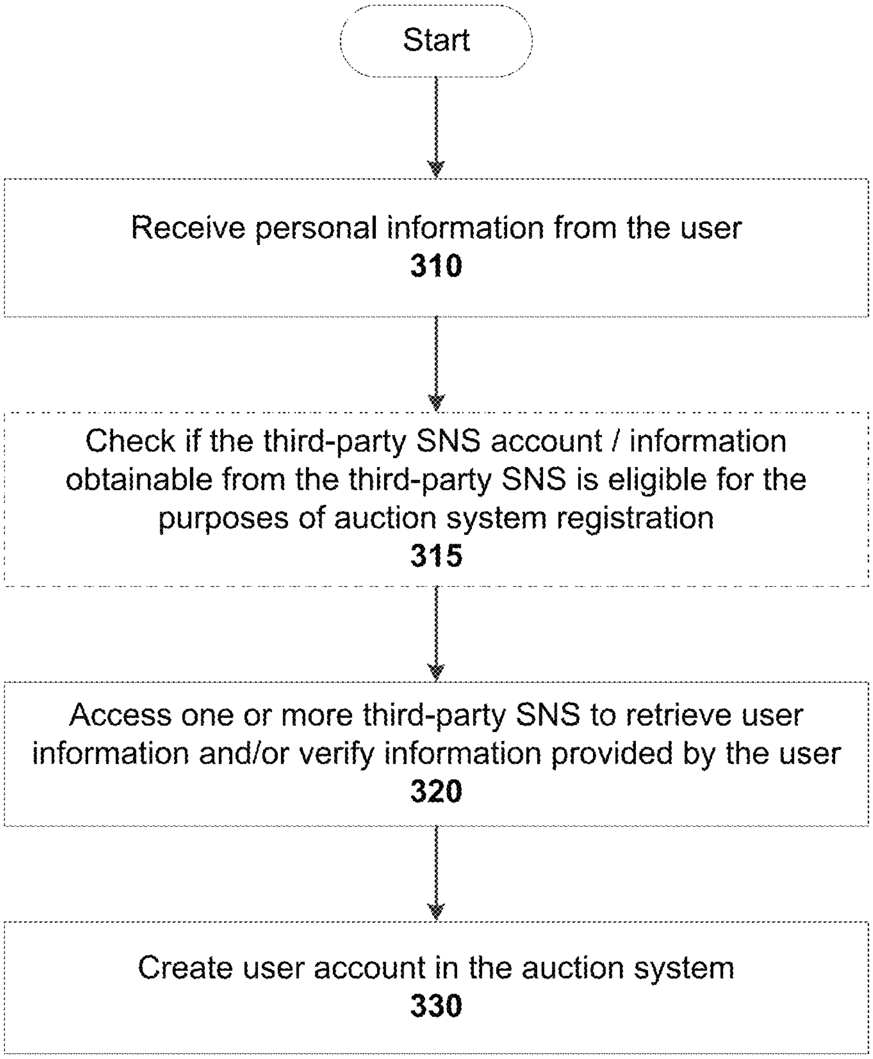
FIG. 3 is a flowchart illustrating exemplary operations of an auction system according to an embodiment of the present disclosure.

Users trying to access the auction system 100 for the first time may be required to go through a registration process. Referring to FIG. 3, an exemplary registration routine for creating a user account is illustrated. In 310, the user may be requested to provide various types of personal information. The personal information may include, but not limited to, the user's name, contact information (e.g., phone number, email address, physical address), as well as the payment information (e.g., bank account information, credit card information). Various other types of mandatory and/or optional personal information may be requested to the user during the registration routine.

In some embodiments, the auction system 100 may request the user to provide her account information (i.e., username and password) of one or more third-party social network platforms ("SNS"), for example, Facebook, Google+, LinkedIn, Blogs, etc., and access the SNS to obtain the user's personal information and/or to verify the information provided by the user. (320) In such cases, the auction system 100 may access the third-party SNS platform, via the API server 112, to obtain various personal information, such as name, age, contact information or even education and employment information, to simplify the registration routine.

Some embodiments of the auction system 100 may be configured in such a way that the user authentication in the auction system 100 occurs via the third-party SNS by using a suitable API provided from the third-party SNS. In this configuration, the user may be required to maintain the third-party SNS account in order to access the auction system 100; however, the auction system 100 may also allow the user to setup an independent password to log into the auction system 100, thereby creating an independent account in the auction system once the necessary information is obtained and/or verified from the third-party SNS. (330) All of the information obtained from the user and the user's third-party SNS may be stored in one or more of the databases implemented in the database server 108.

In addition to simply obtaining some of the personal information for the registration purposes, the auction system 100 may retrieve other types of user information for a variety of purposes. (315) For instance, some of the personal information obtainable from the user's SNS account might not be credible if the SNS account itself was created just prior to registering in the auction system 100. Accordingly, in some embodiments, the auction system 100 may obtain the account creation date or the user profile update date from the third-party SNS. Such dates may be used by the auction system 100 to determine whether the user provided third-party SNS account is eligible to be used as the login for the auction system and/or if the obtained information can be used at all.

It should be appreciated that the information obtainable by linking the third-party SNS accounts may be used by the auction system 100 in implementing a variety of additional functionalities throughout the operations of the auction system. For instance, the auction system 100 may analyze a number of other people's SNS accounts associated to the user's SNS account (e.g., number of friends associated to the SNS account) or the user's activities within the third-party SNS. Such information obtained from the third-party SNS may be utilized by the auction system 100, not only for verifying the legitimacy of the SNS account, but also for advertising listed items via the user's social network. Further, in some embodiments, the user's friends on the third-party SNS may be cross-checked against the auction system accounts to implement bid eligibility feature, which is discussed further below.

To promote users to provide more accurate information during the registration subroutine, the auction system 100 may employ a user classification or user level structure, in which certain user accounts achieving specific classes or levels are afforded with respective privileges and advantages within the auction system 100. Generally, the auction system 100 may be configured in such a way that a user account revealing more personal information is awarded with various forms of incentives and advantages over a user account that hides or lacks personal information. For instance, a user account that is linked with multiple third-party SNS may receive more benefits within the auction system 100 a user account that is linked with only one third-party SNS.

Similarly, the auction system 100 may include various mechanisms for rewarding the user for providing verifiable personal information or allowing the auction system to verify the personal information. For instance, the auction system may verify the user provided information by depositing/withdrawing a small amount in the user's personal bank account, charging/refunding on the user's credit card or reply text on the provided phone number. It should be appreciated that these verifications methods are disclosed as examples. The auction system may employ various other verification methods depending on the types of the personal information obtained from the user.

At least at the time of the registration, the classification of the user account may be determined based on the amount and the accuracy of the information obtained during the registration subroutine. In some embodiments, however, the classification of the user account may continuously change afterwards based on the user's activities. For example, the user may promote the auction system on one or more third-party SNS by posting or sharing a link about the auction system. Similarly, information or an online link to a specific item listed on the auction system can be distributed on the third-party SNS by, for example, utilizing the "Like" feature of the Facebook, tweeting on the Tweeter, or creating a thread in a web forum. The auction system 100 may be configured to analyze such activities and award the user with various benefits including, but not limited to, giving a number of bid credits, providing special auction control features, and adjusting the final sales price of the items won through the auction. The user's account may also be promoted to a higher status user account, which may be entitled to more favorable pre-funding to bid credit exchange rate. Any features and functionalities provided by third-party online applications including, but not limited to, SNS, online games and websites, may be utilized by the auction system for implementing the user account classification structure, so long they are capable of communicating with the auction system 100.

In an aspect, the auction system 100 of the present disclosure may itself function as an SNS, and thus a user's account classification may be developed based on the user's activities within the auction system 100. For instance, the auction system 100 may provide a number of communication features to enable the users to communication with each other. The communication features may include, but are not limited to, a chat room, a forum, an online instant messenger, an email system as well as mobile phone network SMS functionality. The auction system 100 may be configured to analyze the user's communication activities with other users and promote the user account to a higher classification if a track record of sufficient communication activities is shown.

Certain types of user activities may increase the user's account classification more than other types of user activities. For example, a user may provide reviews about the listed items or provide/receive feedbacks about a particular transaction the user had with another user. Such reviews and feedbacks can be stored in the database, and made available for other users to view them. Such activities, which can be useful for other users, may promote the user account at a faster rate or allow it to reach higher status for increased benefits. In addition, the user's transaction activities within the auction system 100 may also be considered in determining the user's account classification. The transaction related factors which may be consider in determining the user classification include, but are not limited to:

1) the total number of funding made by the user account
2) total number of funding on certain items or types of items
3) total number of items won
4) average number of bids used per auction item
5) average number of bids used in winning an item
6) winning/losing rates of the user
7) total number of leaving feedbacks regarding the items won or the seller of the item.

A variety of other user activities and factors may be considered by the auction system 100 in determining the classification of the user account.

Pre-Funding Configuration

The pre-funding requirement is another feature of the auction system 100 that is employed in implement a balanced fee-based auction system. Referring back to FIG. 2, the auction of the item does not initiate until the item's pre-funding requirement is satisfied in 230. Also, unless the user already has a bid credit, she will not be able to bid on the item even when the auction initiates in 250. Accordingly, in 220, the auction system 100 receives fund from the user for one or more listed items (i.e., non-live auction items).

In a way of example, a number of items may be presented on the user's terminal. The items presented to the user may include both live auction items as well as non-live auction items (i.e., listed items) that have not met their pre-funding requirements. If the item the user wishes to bid is a non-live auction item, the user can fund the item to satisfy the item's pre-funding requirement (220), at which point the item becomes a live auction item to initiate the auction (250). It should be noted that the user needs not fund the entire amount of the item's pre-funding requirement. A single item may be funded by multiple users, and also a single user may fund the same item multiple times. Accordingly, when the item's pre-funding amount is not satisfied even after the user's funding, the user has can fund more on the item (Option 1 of FIG. 2) or simply wait for other users to fund the item to satisfy the item's pre-funding requirement (Option 2/240 of FIG. 2). Further, it should be noted that the user may already have bid credits. Information regarding the total number of bid credits held the user may be recorded in the user account database included in the database server 108. As such, the user may not need to fund the item at all, and bid on the item when the item becomes a live auction item by funds received from other users.

Each item listed in the auction system 100 has its own pre-funding requirement, which may be set by the seller of the item or the auction system administrator. The amount of pre-funding requirement of an item may be substantially equal to the item's retail price (e.g., general market price or manufacturer's suggested retail price). In this configuration, the pre-funding requirement provides a financial security for the seller and the auction system administrator even when the final sales price of the item happens to be much lower than the retail price. The pre-funding requirement amount, however, may be set in a variety of ways for many different reasons. For instance, a low pre-funding requirement amount may attract more users and promote more bidding activities on the item, thereby allowing the seller and/or the auction system administrator to gain profit from the pre-funding-to-bid-credit exchange rate. Sometime, the item may be worth a lot more than the retail price due to the item's rarity or popularity, and thus even a high pre-funding requirement amount may be justified without stifling the bidding activities on the item. Further, it should be noted that the auction system administrator may not be the seller of the item. In such a case, the auction system administrator and the item seller may have very different agenda in the auction. Accordingly, in some embodiments, the auction system administrator may require a minimum or a maximum pre-funding requirement amount on certain items.

Each time the user funds an item, she will receive a number of bid credits corresponding to the funding amount, which can be used by the users to bid on any of the live auction items. The number of bid credits provided to the user may be determined by the auction system based on a number of factors. For example, a user with a user profile disclosing more amount of personal/optional information may receive better exchange rate than the standard rate (e.g., 50 cents/bid as opposed to $1/bid). Likewise, allowing the auction system 100 to verify the user provided information by any of the previously discussed verification methods or referencing the auction system or an item listed on the auction system via some of the features in the third-party SNS may result in a number of bonus bid credits. Also, the auction system 100 may offer more favorable exchange rate when additional number of third party SNS accounts are linked to the user's auction system account and/or when the user account's classification is increased by other means. Various other factors and features of the auction system 100 may be used to determine the amount of bid credits provided to the user. In order for the disclosed features of the auction system to properly carry out their intended functions, all bid credits provided to the user, including the extra bid credits obtained through the favored exchange rate as well as the bonus bid credits, should have equal value and functionality within the auction system 100 regardless of how those bid credits were obtained. In 250, the auction for the item initiates upon satisfying the pre-funding requirement, and allow users to bid on the item.

Countdown Timer Management

Figure 4:
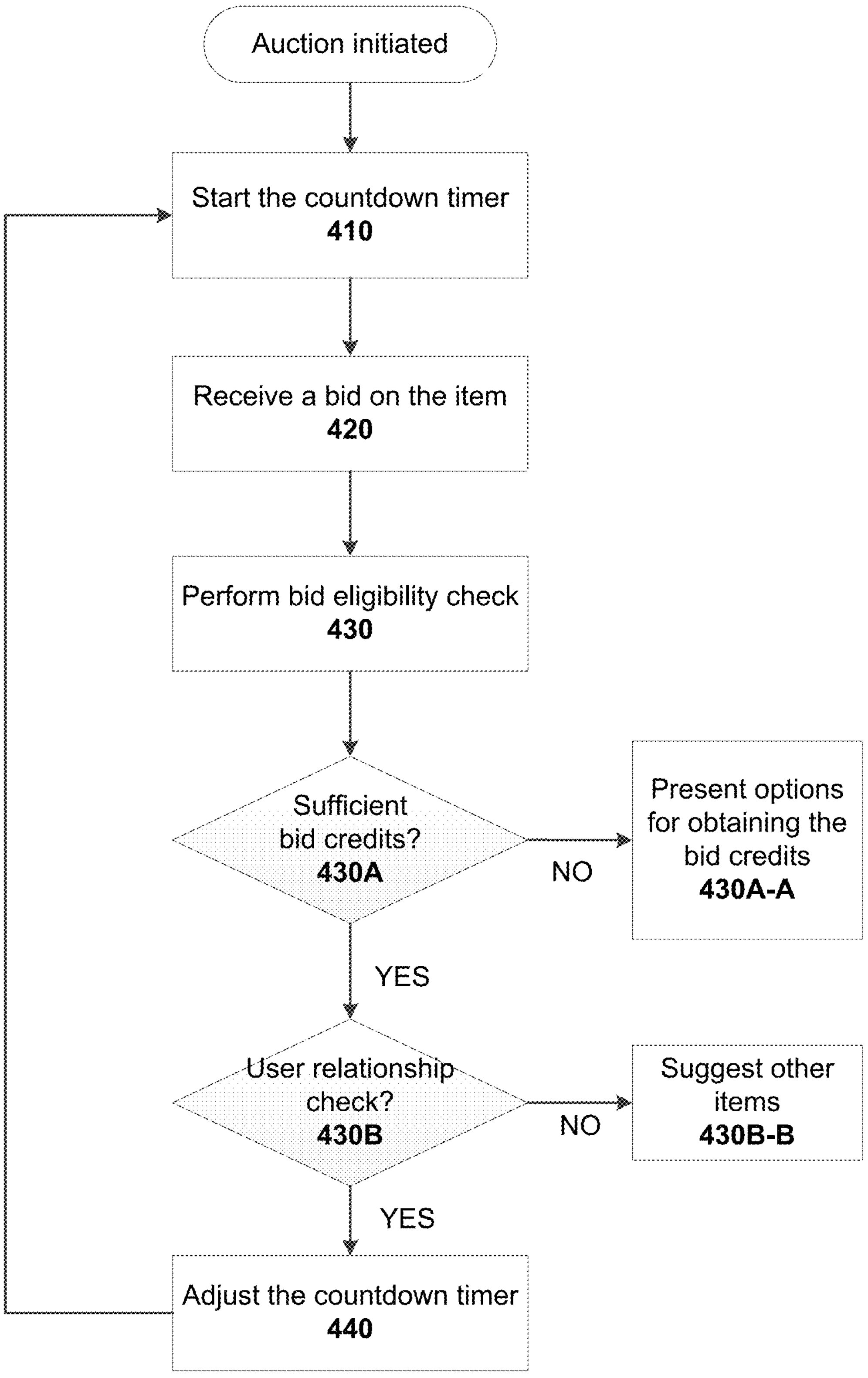
FIG. 4 is a flowchart illustrating exemplary operations of an auction system according to an embodiment of the present disclosure.

FIG. 4 illustrates exemplary operation 400 of an embodiment of an auction system for carrying out an auction of an item. As described above, the countdown timer associated with the item begins to run once the auction initiates (410). The user may bid on the item while the countdown timer is running, and the latest bidder at the expiration of the countdown timer wins the auction. In other words, the countdown timer indicates how long the item will remain up for auction and allow the user to make a strategic decision as to the timing for bidding on the item. The pre-determined time period may be configured by either the auction system or the seller.

In the auction system 100, however, the time remaining in the countdown timer is adjusted every time a bid is placed on the item (440). In one embodiment, the countdown timer resets to the pre-determined time period of the countdown timer (e.g., maximum time period allowed for the countdown timer) when a bid is placed on the item. For instance, the countdown may start at 60 seconds upon the initiation of the auction, decrease down to 10 seconds, and reverts back to the original 60 seconds when a user bids on the item.

In an alternative embodiment, a specific amount of time, for instance 10 seconds, may be added to the remaining time period of the countdown timer when a bid is placed on the item. For example, a bid placed on the item at 10 seconds of time remaining in the countdown timer would increase the time remaining in the countdown timer by 10 seconds, resulting 20 seconds of total remaining time in the countdown timer. This configuration may also have a maximum time period defined for the countdown timer so that the timer does not increase beyond the maximum time period. This may be useful in limiting the total duration of the auction for some of the popular items.

In both of the configurations above, the auction may continue for an indefinite time, requiring the bidders to continuous bid on the item to retain the last bidder position. Accordingly, in some embodiments, the auction system 100 may be configured in such a way that the maximum time period of the countdown timer is reduced by a specific time period or by random time value when certain criteria are met. The criteria for reducing the maximum time period of the countdown timer may include a number of bids placed on the item, the total duration of the auction time since the initiation of the auction, as well as the total price of the item. For example, the maximum time period of the countdown timer may be reduced from 10 minutes to 9 minutes if the total bid counts on the item reaches 100, and further be reduced down to 8 minutes when the total bid counts reaches 300, and so on. Various other criteria can be configured by the auction system administrator or the seller to optimize the auction configuration.

In another embodiment, the auction system 100 may cause the auction to end based on one or more events external to the auction system. For example, auctions for certain items may continue only during a promotional sales period or a third party retailor and the countdown timer may be configured so that it would not go beyond the promotional sales period regardless of the bids adding more time to the timer or resetting the time. In another example, the auction may be configured end at the end of a sport game. Any predictable or unpredictable events may be used in triggering the end of the auction, and such conditions for ending the auction may or may not be disclosed to the bidders.

Bidding Process Management

Throughout the auction process, the latest bidder for the item may be indicated on the user interface. A user who finds that she is not the last bidder may bid on the item so long as the timer is still running (420). In some embodiments, however, the auction system 100 may check whether the user is eligible to bid on the item (430). For instance, the auction system 100 may check if the user has any bid credits to bid on the item and alert the user to obtain the bid credits by any of the suitable methods (430A). In some other embodiments, the seller of the item may be able to define certain bid eligibility requirements. For example, the seller may require a minimum/maximum user classification or a minimum/maximum number of bid credits (e.g., user having at least 100 or more bid credits) for bidding on the item. If the user does not have the sufficient bid credits to bid on the item, the auction system 100 may present the user with options to obtain the necessary bid credits (430A-A). For instance, the user may be presented with one or more non-live auction items for funding or presented with one or more activities that could be performed to obtain bid credits.

In some embodiments, the auction system 100 may check the relationship between the bidder and the other users involved in the auction (430B). For instance, the auction system 100 may be configured to prevent certain user from bidding on the live auction item if the user is closely related to the seller or other bidder(s) who are participating in the auction. In this configuration, the auction system 100 may be configured to pre-analyze the third-party SNS account(s) linked to the seller's SNS account(s) and generate a list of seller's friends. The SNS accounts belonging to the seller's friends may be cross referenced with the auction system accounts (e.g., seller's friends who are registered in the auction system). To prevent fraudulent bidding activities, the user accounts belonging to the seller's friends may be entirely prevented from bidding on the seller's item or may be limited in certain aspects with respect to the seller's auction.

Using the similar third-party SNS account analysis mechanism, the auction system 100 may be configured to identify user accounts that are closely related to each bidder in the auction (e.g., friends of a bidder), and take appropriate measures to prevent group oriented bidding activities among the users. For example, the auction system 100 may analyze the bidding history of the related accounts to check the frequency of those accounts participating in the same auction. Based on the result, the auction system 100 may prevent the related user accounts from bidding on the same auction item. In such a case, the auction system 100 may be configured to automatically search for the identical or similar item, and suggest the user with an alternative item(s) (430B-B). Various other user relationship analysis methods that are currently known or developed in the future may be employed by the auction system 100 to implement various bid eligibility settings.

Item Price Configuration

Each bid by the user may or may not affect the final sales price of the item. In some embodiments, each bid placed on the item may increase the final sales price of the item. For instance, the item's sales price may start at certain price and increase by a predetermined amount (e.g., 1 cent) per every bid placed on the item. When such low price increase configuration is used, the item's final sales price at the end of the auction is generally significantly lower than the retail price (e.g., MSRP). Therefore, the higher rate of bidding activity on the item can be maintained throughout the auction. Even though the final sales price is low, the item has already been pre-funded. Accordingly, the seller of the item may not experience any financial loss depending on the pre-funding requirement of the item and the distribution scheme between the seller and the auction system administrator (e.g., 90% of the pre-funding amount to the seller/10% to the auction system administrator).

In some other embodiments, some of the auctions initiated by the auction system 100 may be configured so that the item's final sales price is pre-set from the beginning of the auction or configured to in such a way that the final sales price is simply eliminate from the auction. In such cases, the number of bids placed on the item would not affect the final sales price, and the last bidder at the expiration of the timer will win the item. Any of the final sales price configuration discussed above may be used by the seller or the auction system administrator in listing the item on the auction system 100.

As discussed above, the auction system 100 provides the bidders with a chance to obtain the desired item at substantial discount. However, it should be noted that the final sales price of the item is may not reflect the total cost to the bidder for obtaining the item. The rate of item's price increased per bid may or may not be the same as the funding-to-bid-credit exchange rate discussed earlier. In other words, a bidder may be required to fund 1 dollar to receive 1 bid credit, which will increase the bidding item's price by 1 cent. Even when there is no final sales price on the item, the bidder must account for the bid credits she used in winning the item. On the other hands, it should be reminded that the user needs not fund the item that she wishes to bid, but instead, fund any of the listed items which may have different funding-to-bid-credit exchange rate than the bidding item.

Auction Modification Tools

Additionally, the auction system may employ various features to assist the bidders to win the desired items at minimal cost. In some embodiments, the auction system 100 may provide an automated bidding tool for the users. The automated bidding tool may be configured by the users to bid on the item at a specified time (e.g., 1 second) prior to the expiration of the timer if the user is not the last bidder in the auction. However, the seller of the item or the auction system administrator may disallow using such automated bidding tool on certain items.

In some embodiments, the auction system 100 may include one or more special purpose auction modification tools for increasing the variability in the operation of the auction. In this respect, the auction system 100 may include an online store, offering various types of automated bidding tools as well as the auction modification tools. Each of the tools may have different functionalities and limitations depending on the auction system configuration. Users may purchase or otherwise obtain the auction modification tools, and strategically used them to win the item by tweaking various elements of the auction in their favor. For example, the auction modification tools may include tools for tweaking the countdown timer, blocking certain bidder(s), modifying the bid eligibility as well as nullifying some of the negative effects caused by the modification tools triggered by others users. Using the auction modification tools, a user may be able to randomize, extend, reduce or even temporarily hide the time remaining in the countdown timer from other users. Also, a user may prevent another user or specific class of users from bidding on certain item for a limited time. It is contemplated that the auction modification tools provide additional auction control mechanism to the bidders as well as add a bit of entertainment to the auction system 100.

Figure 5:
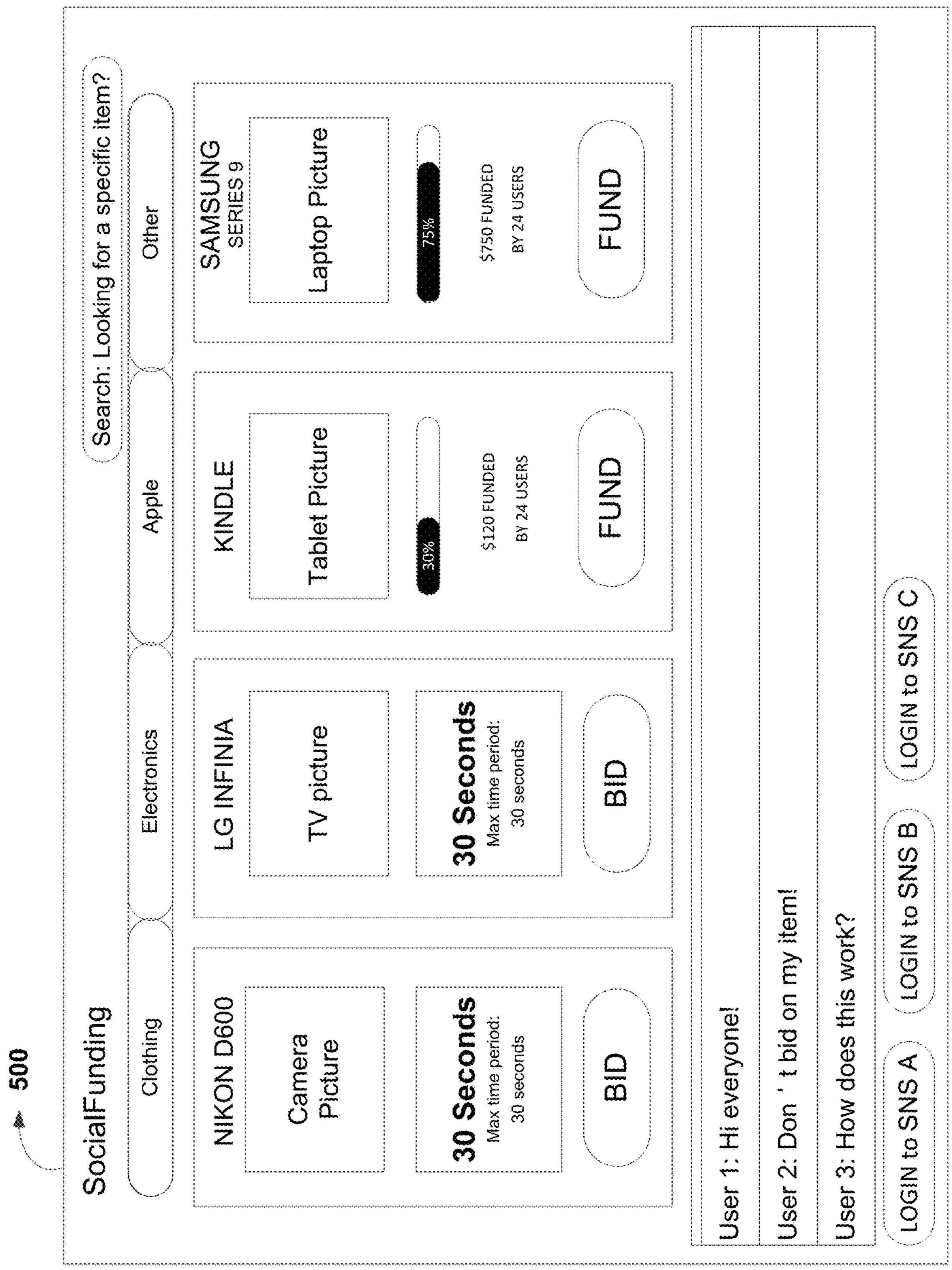
FIG. 5 is a screenshot of an exemplary user interface, according to an embodiment of the present invention.

FIG. 5 illustrates a screenshot of an exemplary home page 500 presented on the user terminal 104. As shown, one or more live auction items as well as non-live auction items may be presented on the home page 500. Each of the live auction items may be presented with a countdown timer indicating the remaining time for the auction and the max time period defined for the auction. In addition, information regarding the item's bidding status, such as the total number of bidders, may be provided. Depending on the configuration, the user may be able to obtain a list of users bidding the item by clicking on any of the bidder related information. For all live auction items, a "Bid" button may be provided for the user to place a bid on the item instantly provided that the user meets all of the eligibility requirements.

Each of the non-live auction items may be presented with a chart indicative of the item's pre-funding requirement status, the number of users who funded the item as well as the total amount of funding received from the users at the given moment. Depending on the configuration, the user may be able to obtain a list of users funding the item by clicking on any of the pre-funding requirement status information. Also, each of the non-live auction items may be provided with an independent "Fund" button for the user to fund the desired item.

The home screen 500 may also provide the users with an interface for searching a specific item (e.g., search box, item category bar) as well as a messaging tool (e.g., chatting panel) for the users to communicate with each other. Furthermore, the home screen 500 may provide a means (e.g., login buttons) for the user to login to the auction system 100 by using the user's third-party SNS credential or to link the user's third-party SNS to the auction system 100, as previously explained above.

Figure 6:
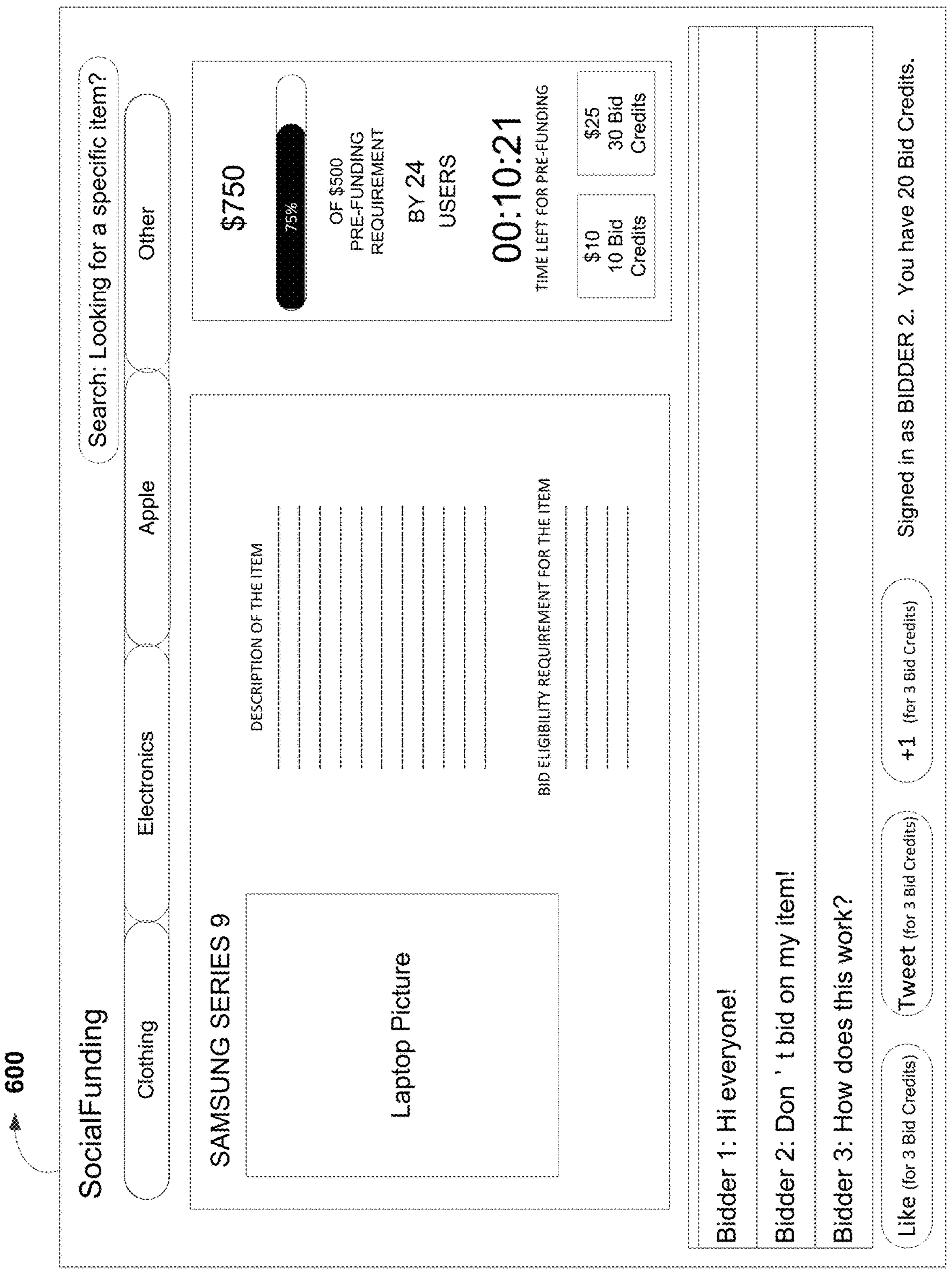
FIG. 6 is a screenshot of an exemplary user interface, according to an embodiment of the present invention.

More detailed information about a specific item may be presented when the user selects an item from the home screen 500. FIG. 6 illustrates an exemplary item information page 600 for a non-live auction item. The item information page 600 may provide a number of basic information regarding the item, such as the item's name, description and specifications. The item information page 600 may also provide more detailed information regarding the item's pre-funding requirement, for example, the total dollar amount of fund received at the moment, a graphical/numerical chart indicative of the pre-funding requirement progress, a total number of users who funded the item as well as any specific limitations defined by the seller and/or the auction system administrator for the item. For instance, the seller or the auction system administrator may have listed the item with a specific time limitation for satisfying a certain amount or a percentage of the item's pre-funding requirement amount. In such a case, the time remaining for reaching the required pre-funding amount/percentage can be provided to the user. A number of preset funding amounts may be provided as a selectable drop-down menu or a set of buttons. Further, the item information page 600 may include a number of SNS buttons for sharing the information regarding item on the user's linked third-party SNS platforms, so that additional people can join the auction system or fund the item. Similar to the home screen 500, an instant messaging tool may be provided in the item information page 600. In some embodiments, the messaging tool is specific to the item shown on the item information page. In other words, the messaging tool provided in a specific item information page may serve as a communication tool only among the users currently viewing the item information page and the users who have funded the item.

Figure 7:
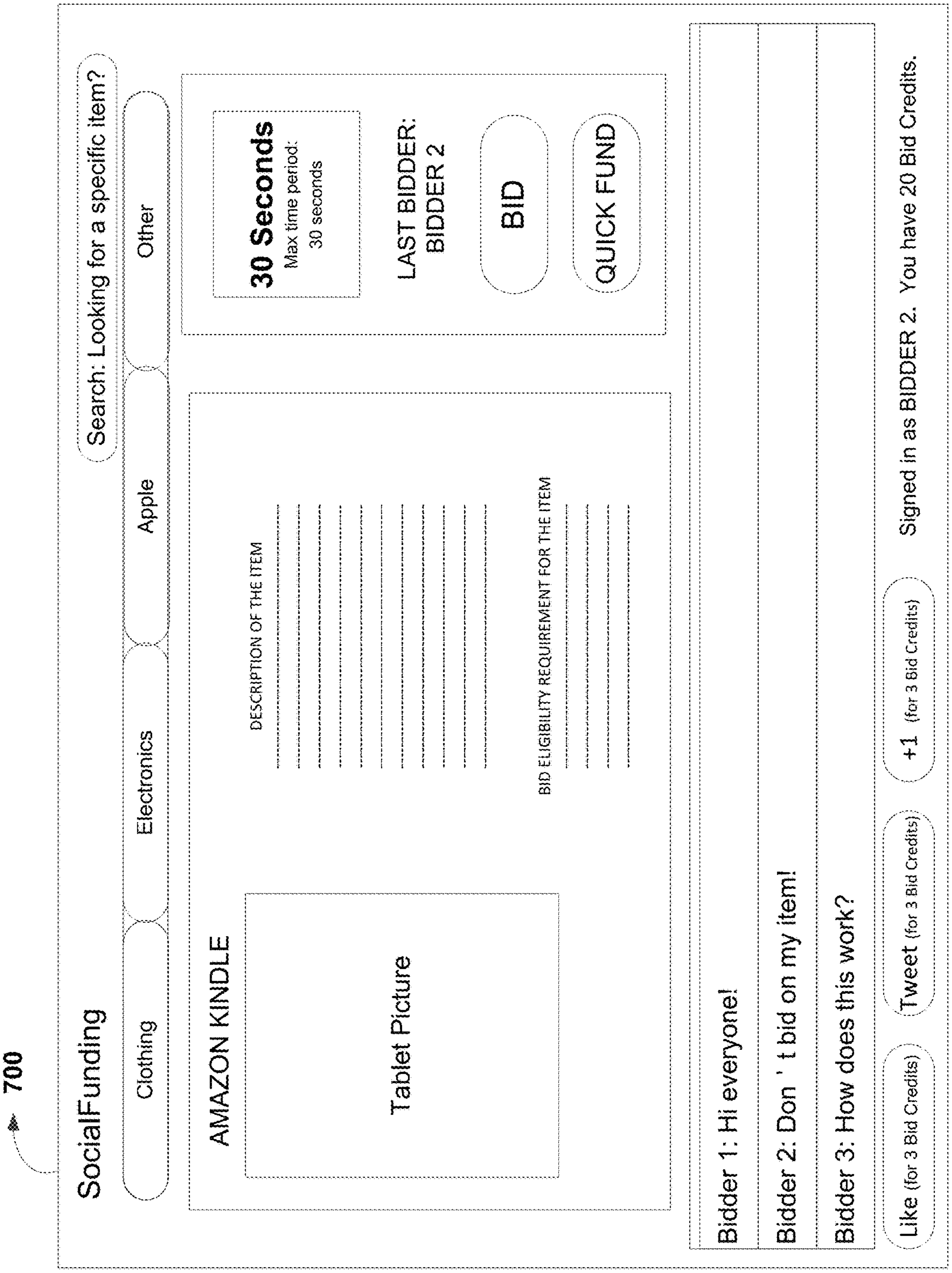
FIG. 7 is a screenshot of an exemplary user interface, according to an embodiment of the present invention.

FIG. 7 illustrates an exemplary item information page 700 for a live auction item. In addition to the number of basic information regarding the item, such as the item's name, description and specifications, the item information page 700 for a live auction item provides a countdown timer indicating the time remaining before the end of auction and the last bidder at the moment. Depending on the user interface configuration provided on the user terminal, various other item related information as well as user related information including, but not limited to, item seller information, total bid counts of the user, any specific requirement defined for bidding on the item as well as the bid history of the item. Of course, bidding on the item is also possible from the item information page 700.

Figure 8:
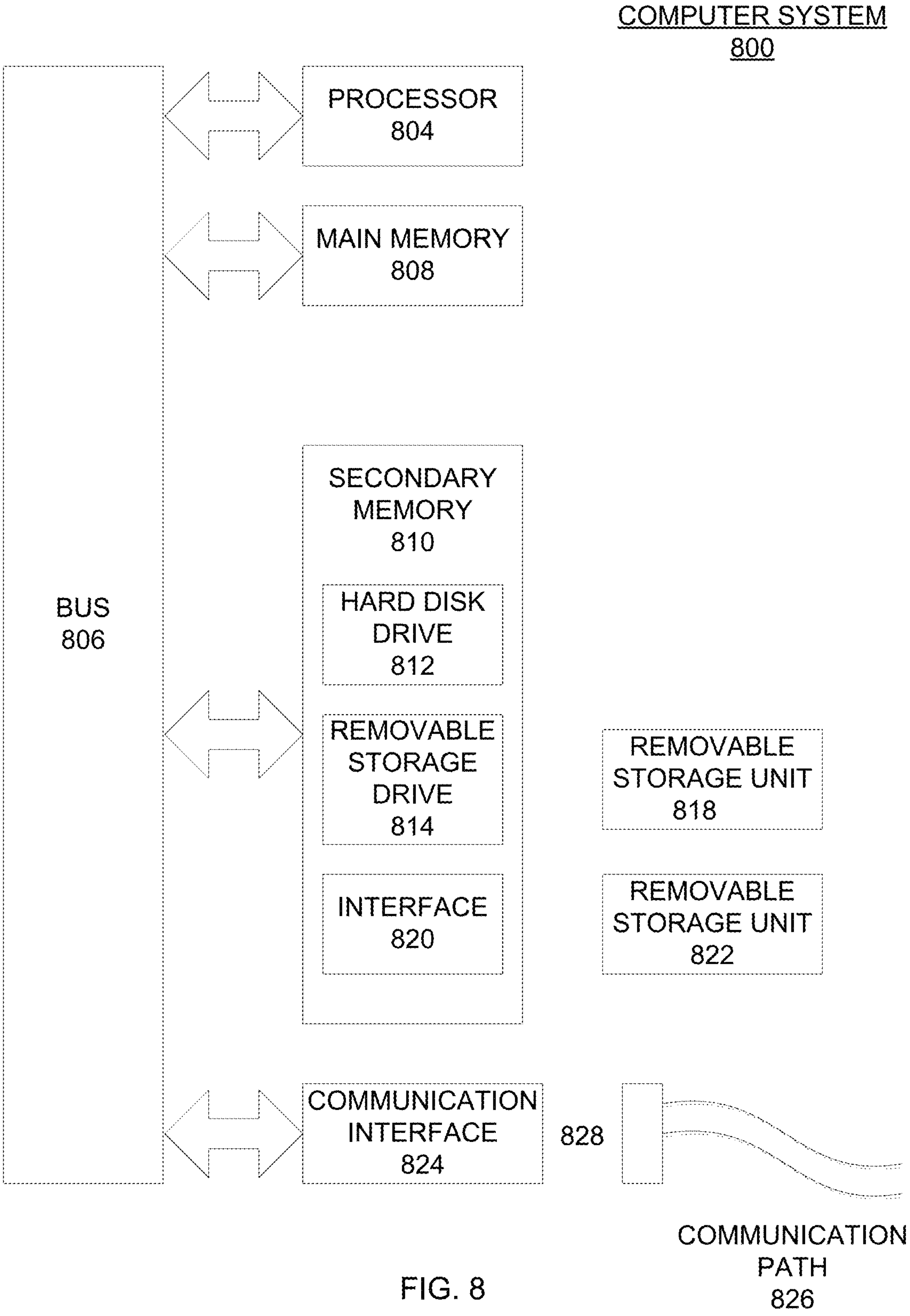
FIG. 8 is a block diagram illustrating an exemplary computer system that may be implemented as computer-readable code, according to an embodiment of the present disclosure.

Embodiments shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems. FIG. 8 illustrates an example computer system 800 in which embodiments, or portions thereof, may be implemented as computer-readable code. For example, the application server 102, the user clients 104, database server 108 as well as any of the modules and databases depicted in FIG. 1, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement embodiments of the present invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement embodiments as discussed herein. In particular, the computer programs, when executed, enable processor device 804 to implement the processes of embodiments of the present invention, such as the stages in the methods illustrated by flowcharts 200, 300, 400 of FIGS. 2-4, discussed above. Accordingly, such computer programs represent controllers of the computer system 800. Where embodiments are implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of embodiments that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for facilitating an online-fee-based auction, the system comprising:

at least one computer processor or a plurality of computer processors;

a social network module executable by said at least one processor or said plurality of computer processors, the social network module configured to use a social network authentication mechanism to generate an authenticated user or a plurality of authenticated users;

a pre-funding management module executable by said at least one computer processor or said plurality of computer processors, the pre-funding management module configured to receive one or more fund submissions from said authenticated user or said plurality of authenticated users on at least one item, and the pre-funding management module configured to provide each authenticated user that provided fund submissions with a number of bid credits corresponding to each fund submission received from each authenticated user, wherein the number of bid credits provided to each authenticated user corresponding to each fund submission is based on a standard exchange rate and a favorable exchange rate, the favorable exchange rate permitting the prefunding module to provide a greater ratio of bid credits to the one or more fund submissions than the standard exchange rate;

an auction module executable by said at least one processor or said plurality of computer processors, the auction module configured to conduct an auction of the item, wherein the auction module is configured to generate an adjustable countdown time indicative of the time remaining in the auction, and the auction module is configured to adjust the time remaining in the adjustable countdown timer by reverting to a maximum time period defined for the adjustable countdown timer and adding a predetermined time period to the time remaining in the adjustable countdown timer, and a graphical user interface connected to the at least one computer processor or the plurality of computer processors, the graphical user interface configured to display the item to be auctioned with a corresponding total of the one or more pre-funding fund submissions and configured to receive at least one fund submission, and the graphical user interface configured to display a live auction of the item, when the auction module conducts an auction of the item, with the adjustable countdown timer and configured to receive at least one bid.

2. The system of claim 1, wherein the auction module is configured to initiate an auction of the item when one or more auction initiation criteria are satisfied for the item.

3. The system of claim 2, wherein the one or more auction initiation criteria comprises:

a threshold pre-funding requirement amount of the item;

a threshold number of fund submissions received from the users on the item;

a threshold time period for satisfying the threshold amount of the pre-funding requirement amount; and a predetermined hold period after reaching a threshold fund amount for the item.

4. The system of claim 2, wherein the auction module is configured to adjust the time remaining in the adjustable countdown timer when the one or more users place a bid on the item before the adjustable countdown timer expires, and end the auction of the item when the adjustable countdown timer expires, with the user who placed the latest bid being the winner of the auction.

5. The system of claim 4, wherein the auction module is configured to adjust the time remaining in the adjustable countdown timer by subtracting the predetermined time period from the time remaining in the adjustable countdown timer.

6. The system of claim 5, wherein the maximum time period defined for the adjustable countdown timer is successively reduced when one or more predetermined timer reduction criteria are satisfied.

7. The system of claim 6, wherein the one or more predetermine timer reduction criteria comprises:

a total number of bids placed on the item;

a total number of users who have activated the automated bidding tool to bid on the item;

a total number of bidders on the item; and a total duration of the auction from the initiation of the auction.

8. The system of claim 4, wherein the adjustable timer is configured to expire based on one or more predefined external events.

9. The system of claim 1, wherein the social network authentication mechanism is configured to perform one or more operations including:

generating a user account for each of the users based on the user's personal information;

verifying the user's personal information;

verifying the user's name and address matches between social networks;

assigning each user account with at least one user classification eligible for one or more corresponding auction related features;

managing the user's eligibility to place a bid on the item; and managing the user's eligibility to use the one or more auction related features.

10. A non-transitory machine-readable medium containing a set of executable instructions to facilitate a method of conducting an on-line-bidding-fee-based auction, the method comprising the steps of:

granting access to a user or a plurality of users after the user or plurality of users are verified via a social network authentication mechanism;

receiving at least one fund submission or a plurality of fund submissions, via a graphical user interface, from a verified user or plurality of verified users, the fund submission corresponding to at least one item;

displaying, via the graphical user interface, the item to be auctioned with a corresponding total of the at least one fund submission or a plurality of fund submissions;

providing each verified user, which submitted funds, with a number of bid credits corresponding to the amount of the funds submitted by each respective verified user, wherein the number of bid credits provided to each authenticated user corresponding to each fund submission is based on a standard exchange rate and a favorable exchange rate, the favorable exchange rate permitting the prefunding module to provide a greater ratio of bid credits to the one or more fund submissions than the standard exchange rate;

initiating an auction of the item when a predetermined pre-funding requirement amount of the item is satisfied;

displaying, via the graphical user interface, the auction of the item after initiation of the auction;

receiving bids, via a graphical user interface, from at least one verified user or a plurality of verified users with bid credits corresponding to the item being auctioned;

providing, via the graphical user interface, an adjustable countdown timer indicative of time remaining in the auction of the item;

adjusting the time remaining in the adjustable countdown timer when one or more bids are placed on the item before the adjustable countdown timer expires, wherein the time remaining in the adjustable countdown timer is changed by reverting to a maximum time period defined for the adjustable countdown timer and adding a predetermined time period to the time remaining in the adjustable countdown timer;

ending the auction of the item when the adjustable countdown timer expires, and designating the verified user, placing a latest bid, as the winner of the auction.

11. A method comprising the steps of:

providing a graphical user interface in communication with a server or computer system;

receiving, at the server via the graphical user interface, one or more user requests to authorize access to an auction system;

granting auction access to a user after the user is verified with a social network authentication mechanism implemented by a social network module in the server;

receiving, at the server via the graphical user interface, one or more fund submissions from one or more users, which were granted auction access, towards an item to be auctioned;

providing each of the users, which provided a fund submission, with a number of bid credits corresponding to the fund submission submitted by the respective user, wherein the number of bid credits provided to each fund submitting user is based on a standard exchange rate and a favorable exchange rate, the favorable exchange rate providing a greater ratio of bid credits to the fund submission than the standard exchange rate;

displaying, via the graphical user interface, the item to be auctioned with a corresponding total of the at least one fund submission or a plurality of fund submissions;

initiating an auction of the item, when one or more auction initiation criteria are satisfied for the item;

receiving, at the server via the graphical user interface, a bid or a plurality of bids on the item, the bids being from the user or plurality of users with bid credits corresponding to the item being auctioned;

utilizing an adjustable countdown timer associated with the server, and allowing the adjustable countdown timer to adjust a remaining auction time in response to receiving the bid or the plurality of bids on the item for auction, wherein the remaining auction time in the adjustable countdown timer is changed by reverting to a maximum time period defined for the adjustable countdown timer and adding a predetermined time period to the remaining auction time in the adjustable countdown timer; and displaying, via the graphical user interface, an auction of the item and corresponding remaining auction time determined by the adjustable countdown timer;

ending the auction at an expiration of the adjustable countdown timer; and recognizing, via the server, a bidding user placing a latest bid on the auctioned item as being a winner of the auction.

12. The method of claim 11, wherein the one or more auction initiation criteria comprises:

a threshold pre-funding requirement amount of the item;

a threshold number of fund submissions received froze the users on the item;

a threshold time period for satisfying the threshold amount of the pre-funding requirement amount; and a predetermined hold period after reaching a threshold fund amount for the item.

13. The method of claim 11, wherein the step of adjusting the remaining auction time further comprises the step of:

setting the predetermined auction time value; and successively reducing the predetermined auction time value, when one or more predetermined timer reduction criteria are satisfied.

14. The method of claim 13, wherein the predetermined timer reduction criteria comprises:

a total number of bids placed on the item;

a total number of users who have activated the automated bidding tool to bid on the item;

a total number of bidders on the item; and a total duration of the auction from the initiation of the auction.

15. The method of claim 11, wherein the step of adjusting the remaining auction time further comprises the step of:

allowing the adjustable countdown timer to expire based on one or more predefined external events.

16. The method of claim 11, further comprising the step of:

generating a user account for each user, wherein each user account is assigned with at least one user classification providing one or more of corresponding auction related features.

17. The method of claim 16, wherein the user classification assigned to the user account is determined based on one or more user classification factors comprising:

an amount of personal information about the user provided by the user;

an accuracy of personal information about the user provided by the user;

a total number of third-party social network sites linked to the user account;

social networking activities performed by the user; and transaction activities performed by the user.

18. The method of claim 16, wherein the one or more auction related features comprise:

a predetermined funding-to-bid-credit exchange rate corresponding to the assigned user classification;

an ability to use an automated bidding tool; and an ability to use one or more auction modification tools allowed for the assigned user classification.

* * * * *